United States Patent
Hur (10) Patent No.: US 7,681,010 B2
(45) Date of Patent: Mar. 16, 2010

(54) APPARATUS AND METHOD FOR A MANAGING FILE SYSTEM

(75) Inventor: Joone Hur, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 11/391,453

(22) Filed: Mar. 29, 2006

(65) Prior Publication Data
US 2006/0235910 A1 Oct. 19, 2006

(30) Foreign Application Priority Data
Apr. 14, 2005 (KR) .................. 10-2005-0031109

(51) Int. Cl.
G06F 13/00 (2006.01)
G06F 13/28 (2006.01)
G06F 12/00 (2006.01)
G06F 17/30 (2006.01)

(52) U.S. Cl. .................. 711/171; 711/170; 707/205
(58) Field of Classification Search .................. None
See application file for complete search history.

(56) References Cited

U.S. PATENT DOCUMENTS

| 5,592,662 | A | 1/1997 | Sawada et al. |
| 6,401,181 | B1 | 6/2002 | Franaszek et al. |
| 6,711,588 | B1 | 3/2004 | Yamanaka et al. |
| 2002/0184436 | A1 | 12/2002 | Kim et al. |
| 2004/0260673 | A1 | 12/2004 | Hitz et al. |
| 2005/0027956 | A1 | 2/2005 | Tormasov et al. |

FOREIGN PATENT DOCUMENTS

| JP | 02-096213 A | 4/1990 |
| JP | 8-115238 A | 5/1996 |
| JP | 2003-296156 A | 10/2003 |
| JP | 2004-013276 A | 1/2004 |
| KR | 10-2000-0020057 A | 4/2000 |
| KR | 10-2002-0092550 A | 12/2002 |
| KR | 1020030071245 A | 9/2003 |

OTHER PUBLICATIONS

Korean Office Action dated Aug. 30, 2006 issued in corresponding Korean Patent Application No. 2005-31109.

*Primary Examiner*—Kevin Verbrugge
*Assistant Examiner*—Eric S Cardwell
(74) *Attorney, Agent, or Firm*—Sughrue Mion, PLLC

(57) ABSTRACT

Disclosed are an apparatus and a method for managing a file system. The apparatus of managing file system including a user input unit that an input value corresponding to a predetermined data is input, a data storage unit comprising several data blocks having a predetermined size able to store the data, and a information storage unit that stores data information about the data stored in the data block, and a control unit that stores data corresponding to the input value in an empty space of each data block by using the stored data information.

14 Claims, 8 Drawing Sheets

APPARATUS AND METHOD FOR A MANAGING FILE SYSTEM

CROSS-REFERENCE TO RELATED APPLICATION

This application claims priority from Korean Patent Application Nos. 10-2005-0031109 filed on Apr. 14, 2005 in the Korean Intellectual Property Office, the disclosures of which are incorporated herein in their entireties by reference.

BACKGROUND OF THE INVENTION

1. Field of the Invention

The present invention relates to an apparatus and a method for managing a file system, and more particularly, to an apparatus and a method for managing a file system that can efficiently use a data block of the file system.

2. Description of the Related Art

File systems have been continuously studied since the computer was first introduced, and many file systems have been produced. Typically, examples of the file system include the Unix File System (UFS), System File System (SFS), Veritas File System (VxFS), Remote File Sharing (RFS), and Network File System (NFS).

These stable and efficient file systems are widely used in commerce, but they have the following defects. In two of these systems, the Unix File System and the System File System, initially formatted structures cannot be changed later, and the whole file system can only be backed up to a file system having the same format and size. In the Veritas File System, it is possible to change the initially formatted file system because it is continuously augmented, but it can only be backed up by another Veritas file system being at least the same size. The network File System and the Remote File Sharing are not new. They are mechanisms that support shared use of a file system among several computers.

Figure 1:
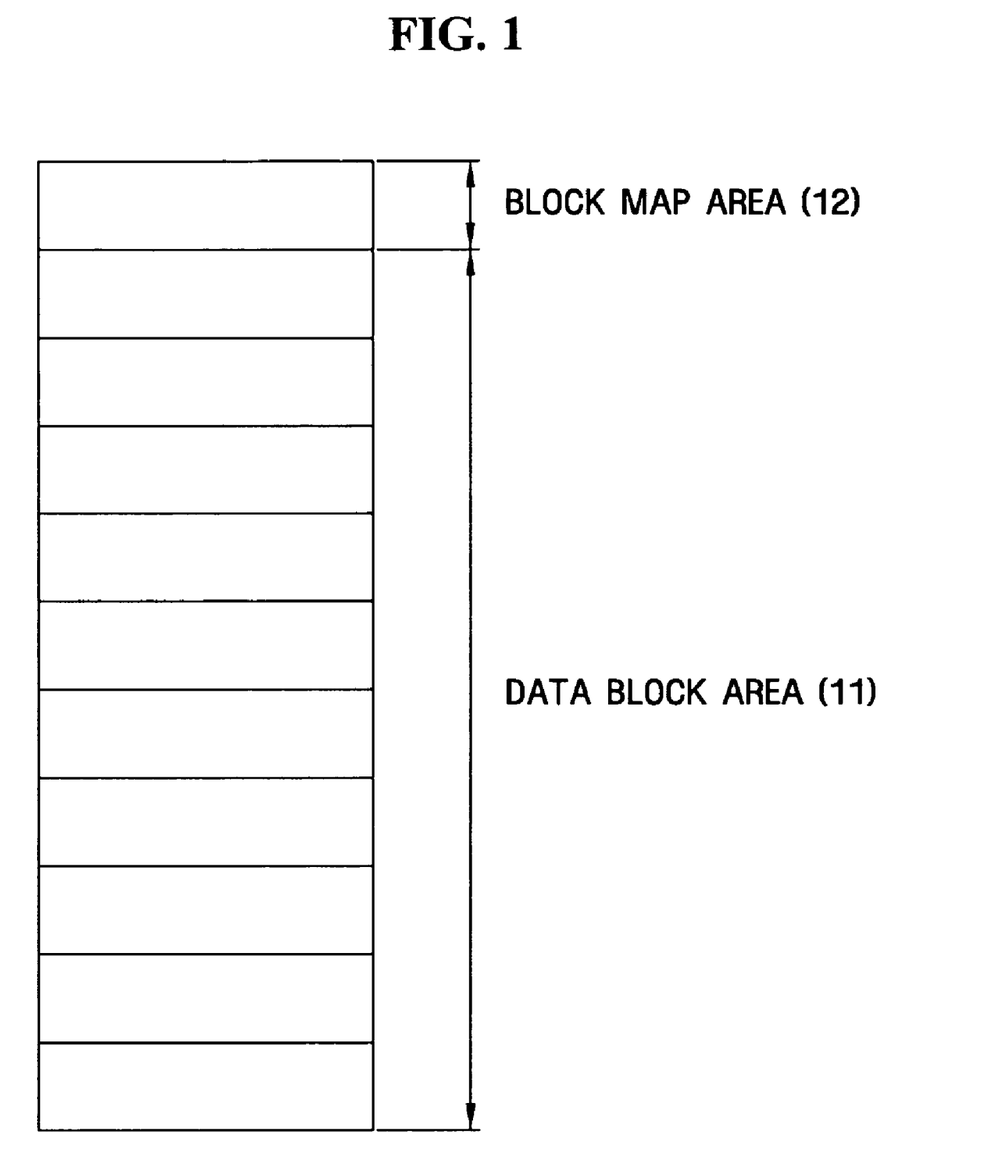
FIG. 1 is a diagram of a conventional format of a file system.

FIG. 1 is a diagram of a conventional format of a file system.

Referring to FIG. 1, the conventional file system format comprises a data block area 11 to store data and a block map area 12 to store block maps which include information about the data stored in the data block area 11.

The data block area 11 consists of a plurality of data blocks uniform in size, and the block map of the block map area 12 includes information on the data stored in each data block, i.e., the size of the data block. Also, the block map may include details on the relationships between respective data blocks when the data having a predetermined size exceeds the data block size.

Figure 2:
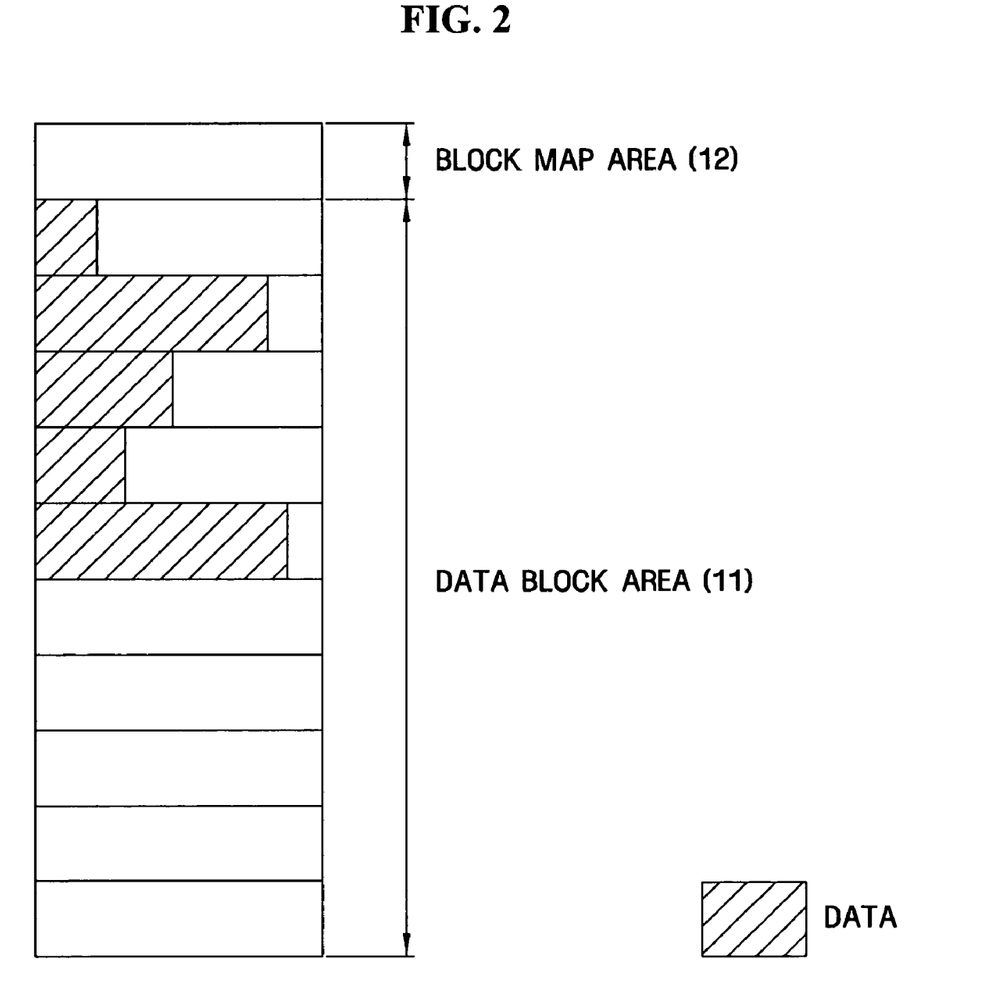
FIG. 2 is a diagram of a conventional format of a file system showing stored data.

FIG. 2 is a diagram of a conventional format of a file system illustrating how data is stored in the data area block area 11 of FIG. 1. By way of example, it is assumed that the size of each data block in the data block area 11 is 100 KB. It is also assumed that only data is stored in each data block.

Referring to FIG. 2, data is stored in each data block of the data block area 11. Here, each data block is allotted to one set of data regardless of the size of the data to be stored. Accordingly, one data block is allotted to 10 KB of data and another is allotted to 70 KB. Accordingly, 90 KB is unused when 10 KB of data is stored, and 30 KB is unused when 70 KB of data is stored. If the size of the stored data exceeds the size of one data block, the data may be stored in several data blocks.

As described above, if the stored data size does not exceed one data block, the unused empty space will be wasted. The storage efficiency of this system is poor because space is wasted even when the size of the data exceeds one data block.

Korean Unexamined Patent Publication No. 2000-0020057 discloses a method for composing a dynamic file system comprising determining the useful space of a file system, determining a data block size among the useful blocks, generating an arbitrary file, and composing the arbitrary file as a dynamic file. However, the block is separately determined, and therefore, it is difficult to apply this to every data block.

SUMMARY OF THE INVENTION

An aspect of the present invention is to provide an apparatus and a method for managing a file system by which a space of a data block can be efficiently used by determining an empty space of the data block to store data and storing the data in the empty space according to the determination result.

These aspects, features and advantages of the present invention will become apparent to those skilled in the art from the following disclosure.

According to another aspect of the present invention, there is provided an apparatus of managing a file system including a user input unit where an input value corresponding to predetermined data is input, a data storage unit comprising several data blocks having a predetermined size able to store the data, an information storage unit that stores data information about the data stored in the data block, and a control unit that stores data corresponding to the input value in an empty space of each data block by using the stored data information.

According to another aspect of the present invention, there is provided a method for managing a file system including an input value corresponding to a predetermined data, abstracting data information about the data stored in several data block having a predetermined size able to store the data, and storing data corresponding to the input value in an empty space of the each data block according to the abstracted data information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of this invention are shown. Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

An exemplary embodiment of the present invention will now be described in more detail with reference to the accompanying drawings.

Figure 3:
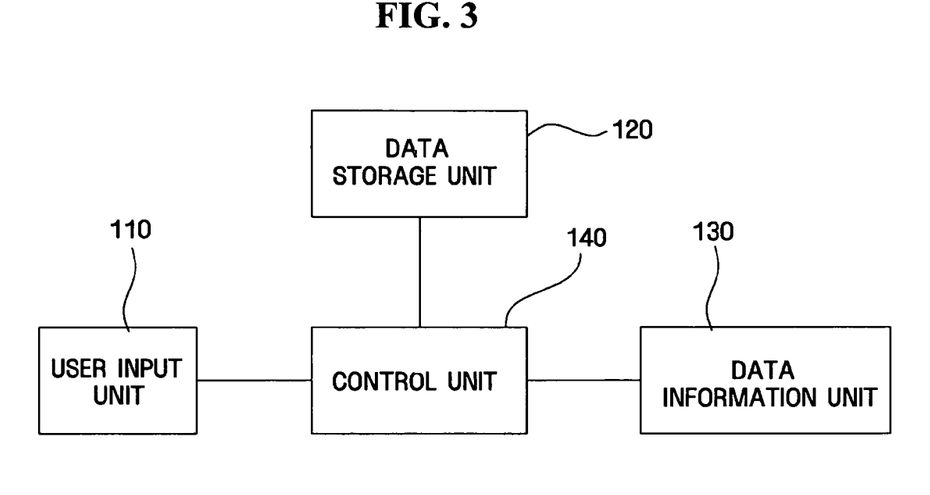
FIG. 3 is a block diagram of a file system management apparatus according to an exemplary embodiment of the present invention.

FIG. 3 is a diagram of a file system management apparatus according to an exemplary embodiment of the present invention.

Referring to FIG. 3, the file system management apparatus comprises a user input unit 110 to allow a user to input predetermined data, a data storage unit 120 including a plurality of data blocks each having a predetermined size for storing data, an information storage unit 130 to store information about the data stored in each data block, and a control unit 140 to determine the empty space of each data block of the data storage unit 120 based on the stored data information and which stores data in the determined empty space.

Information stored in the data information storage unit 130 may include the total used space of each data block and the space used by each set of data stored in each data block, but the present invention is not limited to this.

Hereinafter, information about the total used space of each data block is referred to as a block map, and information about the space used by each set of data stored in each data block is referred to as a sub-block map.

The block map includes information on the total space used by data stored in a data block regardless of the amount of data stored in a predetermined data block. The sub-block map may include the space used by each set of data stored in a predetermined data block, e.g., a starting position in the concerned data block, used space, and information on relationships with other data blocks. When the data is separately stored in other data blocks because the unused space of the concerned data block is insufficient to store the data, the relations between the data blocks to store the concerned data can be represented in view of the relationships with other data blocks.

In terms of hardware, the data information storage unit 130 may be integrally combined with the data storage unit 120 or separately constructed. When the data storage unit 120 is storage medium such as a hard disk or a flash memory, the data information storage unit 130 may be combined with the hard disk or the flash memory, or it may be separate from them.

The control unit 140 may determine the unused space of each data block through the block map and the sub-block map, and store the data input received via the user input unit 110 in the empty space as a result of the determination. The control unit 140 may store all the input data in the empty space of the data block, or divide the data and store it in other data block(s) when the empty space is not enough.

When the input data is stored, the control unit 140 updates the block map and the sub-block map in order to allow a user to reference them when storing data in the future. Updating of the block map and the sub-block map may be performed not only when data is stored but also when data is deleted.

For example, when the size of each data block is 100 KB and the size of a predetermined data block is 50 KB, the control unit 140 can determine that the empty space of the predetermined data block is 50 KB. If a user desires to store 70 KB of data, the 50 K B data is stored in the empty space of the predetermined data block, and the other 20 KB of data is stored in another data block. That is, data is divided and stored in two data blocks. Accordingly, the control unit 140 may easily access the predetermined data through relationships between data blocks in which the data recoded and the sub-block map. The sub-block data may include a data block from which data starts, the starting position of the data, relationships with other data blocks and the size of the stored data.

Figure 4:
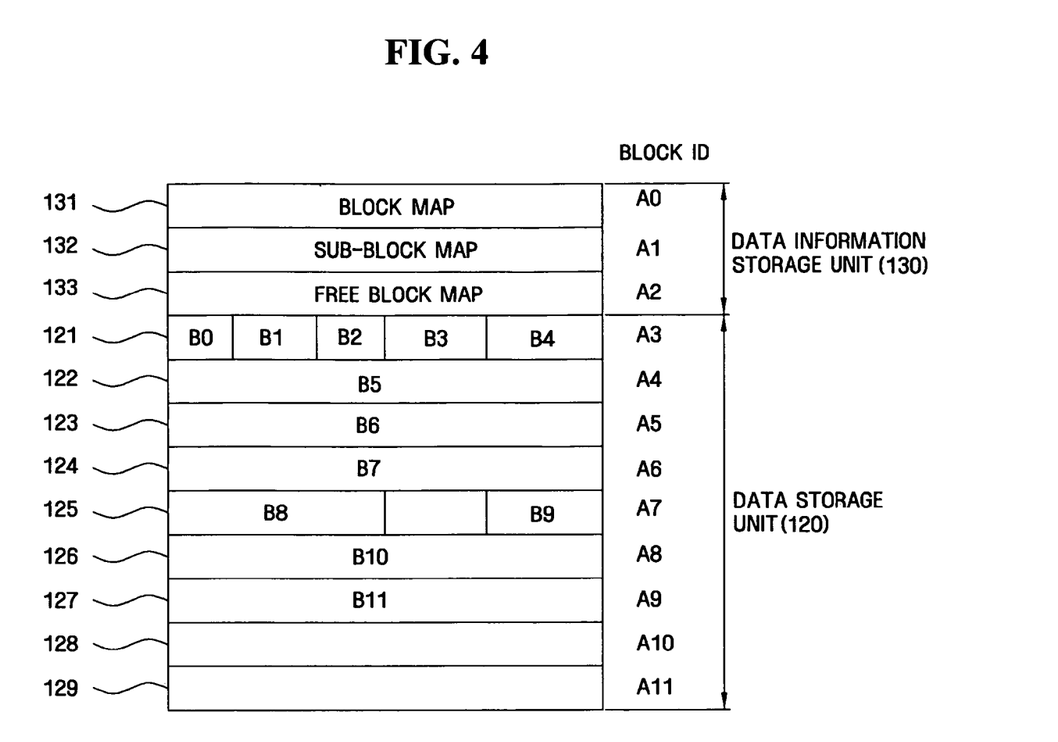
FIG. 4 illustrates the file system format according to an exemplary embodiment of the present invention.

FIG. 4 illustrates the data storage unit 120 and the data information storage unit 130 according to an exemplary embodiment of the present invention.

Referring to FIG. 4, the data storage unit 120 consists of a plurality of data blocks 121 to 129 each having a predetermined size. The data information storage unit 130 may consist of data blocks 131 to 133 respectively storing a block map, which is data information on data stored in the data storage unit 120, a sub block map, and a free block map including information on the empty space of each data block 121 to 129 of the data storage unit 120. Here, it is assumed that data blocks 131 to 133 of the data information storage unit 130 have the same size as data blocks 121 to 129 of the data storage unit 120, and the data storage unit 120 and data information storage unit 130 are integrated. However, this is assumed only for purposes of illustration and the present invention is not limited to this arrangement.

Each data block of the data storage unit 120 and the data information storage unit 130 and each set of data stored in the data storage unit 120 in FIG. 4 may be respectively granted an ID in order to identify it.

Hereinafter, an ID granted to each data block is referred to as a block ID, and an ID granted to each set of data is referred to as a sub-block ID. In order to distinguish the block ID from the sub block ID, the block IDs are marked as A0, A1, A2, A3 ... and the sub block IDs are marked as B1, B2, B3 ....

The sub block ID may be associated with a predetermined data in the order of block IDs of data blocks. For example, when the predetermined data is divided and stored in data blocks having block IDs of A3 and A4, a data block having a block ID of A4 is granted a sub-block ID of B5 if a data block having a block ID of A3 is granted a sub block ID of B4. Accordingly, the concerned data may have sub-block IDs of B4 and B5. In the present embodiment, it was described by way of example that when a predetermined set of data is divided and stored in a plurality of data blocks, different sub-block IDs are granted to the respective data blocks to establish relationships between the data blocks; however, the present invention is not so limited. The relationships between each data block may be checked through many methods such as offset of the data block and the size of the data.

For a better understanding of the present invention, relationships between the sub-block ID of each set of data stored in the data storage unit 120 in FIG. 4 and data label will be described by referring to Table 1.

TABLE 1

| SUB-BLOCK ID | DATA LABLE |
|---|---|
| B0 | Text1.txt |
| B1 | Text2.txt |
| B2 | Text3.txt |
| B3 | Text4.txt |

TABLE 1-continued

| SUB-BLOCK ID | DATA LABLE |
|---|---|
| B4~B8 | Music1.mp3 |
| B9 | Text5.txt |
| B10~B11 | Music2.mp3 |

When data having the sub-block IDs exemplified in Table 1 is stored in the data storage unit 120 of FIG. 4, a block map of each data block is exemplified in Table 2. Table 2 includes block IDs and the amount of used space of the data blocks.

TABLE 2

| BLOCK ID | USED SPACE (KB) |
|---|---|
| A0 | 100 |
| A1 | 100 |
| A2 | 100 |
| A3 | 100 |
| A4 | 100 |
| A5 | 100 |
| A6 | 100 |
| A7 | 75 |
| A8 | 100 |
| A9 | 100 |
| A10 | 0 |
| A11 | 0 |

Table 3 shows sub-block maps representing data information on the data stored in the data blocks 121 to 129 together with the block maps of Table 2.

TABLE 3

| SUB-BLOCK ID | BLOCK ID | STARTING POSITION | SIZE | NEXT SUB-BLOCK ID |
|---|---|---|---|---|
| B0 | A3 | 0 | 15 | EOF |
| B1 | A3 | 15 | 20 | EOF |
| B2 | A3 | 35 | 15 | EOF |
| B3 | A3 | 50 | 25 | EOF |
| B4 | A3 | 75 | 25 | B5 |
| B5 | A4 | 0 | 100 | B6 |
| B6 | A5 | 0 | 100 | B7 |
| B7 | A6 | 0 | 100 | B8 |
| B8 | A7 | 0 | 50 | EOF |
| B9 | A7 | 75 | 25 | EOF |
| B10 | A8 | 0 | 100 | EOF |
| B11 | A9 | 0 | 100 | EOF |

In Table 3, EOF (End of File) means the end of the data; sub-blocks marked with EOF in Table 3 are not searched for a next sub-block.

The control unit 140 manages empty spaces of the data storage unit 120 through free block maps described above. When the data storage unit 120 has an empty space as described with reference to FIG. 4, the free block maps 133 are indicated as in Table 4.

TABLE 4

| BLOCK ID | STARTING POSITION | SIZE |
|---|---|---|
| A7 | 50 | 25 |
| A10 | 0 | 100 |
| A11 | 0 | 100 |

Operations of the file system management apparatus according to an exemplary embodiment of the present invention will be described.

Figure 5:
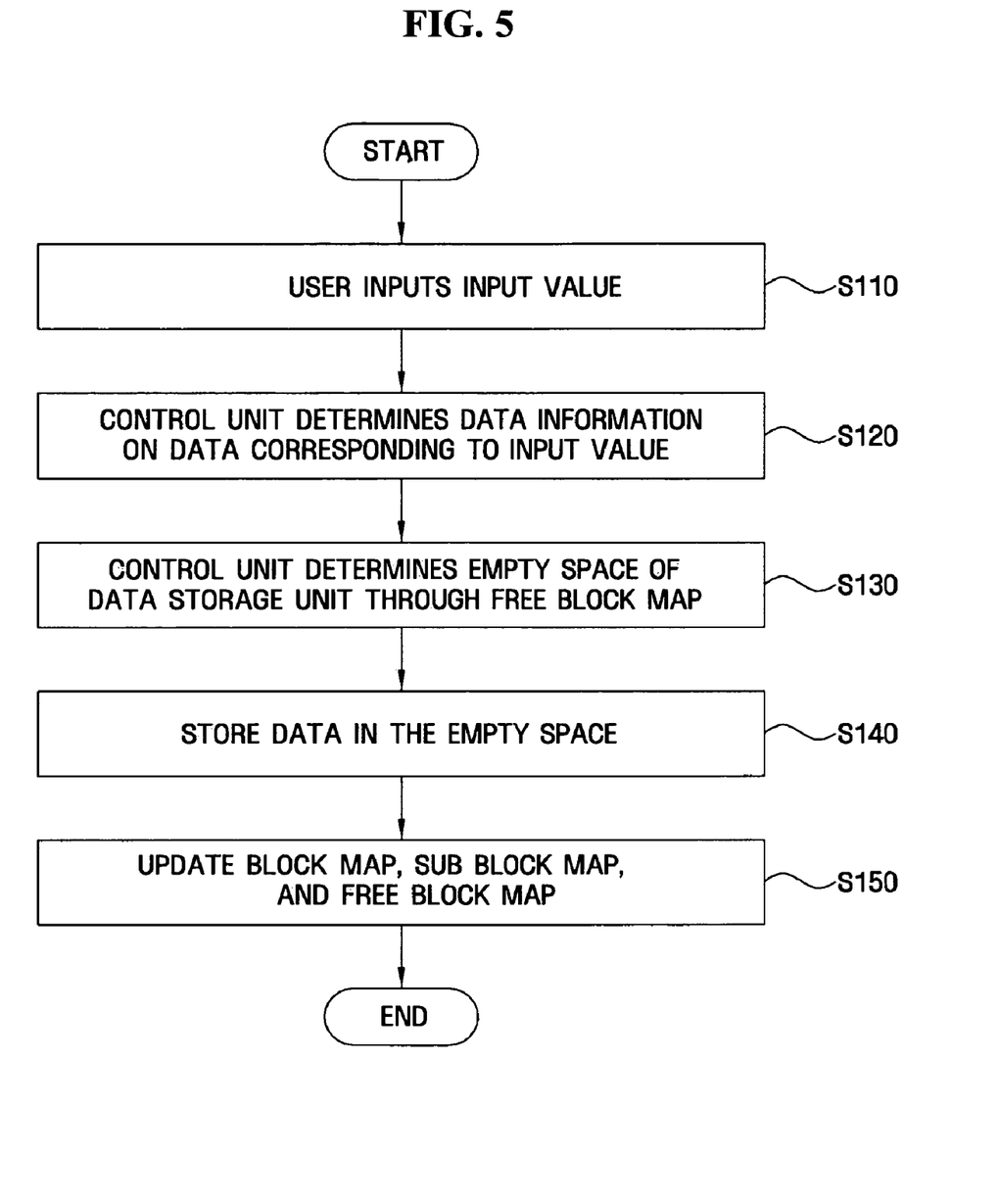
FIG. 5 is a flowchart illustrating a method of storing data in a data storage unit according to an exemplary embodiment of the present invention.

FIG. 5 is a flowchart illustrating a method of storing data in a file system according to an exemplary embodiment of the present invention. The file system management method of the present invention may be applied to storing, deleting and copying data of the data storage unit 120. In the present exemplary embodiment, it is assumed that predetermined data is stored in and deleted from the data storage unit 120.

As illustrated, a user inputs an input value to store predetermined data in the data storage unit 120 through the user input unit 100 S110.

The control unit 140 determines data information on the data corresponding to the input value S120. This data information may be the size of the predetermined data.

The control unit 140 determines the empty space of the storage unit 120 in reference to the free block map 133 described above S130.

When it has been determined that empty space is present in the storage unit 120, the control unit 140 stores data corresponding to the input value in the empty space S140.

The control 140 updates the block map, the sub-block map, and the free block map after the data has been stored S150. Table 1 (described above) may be updated by adding the space used by the stored data to the block map according to the input value of Table 2, and allotting a sub-block ID when all the data corresponding to the input value is stored in one data block, or allotting a sub-block ID to each data block when data is divided and stored in more than one data block.

Free block maps update empty spaces after data corresponding to the input value has been stored.

Figure 6:
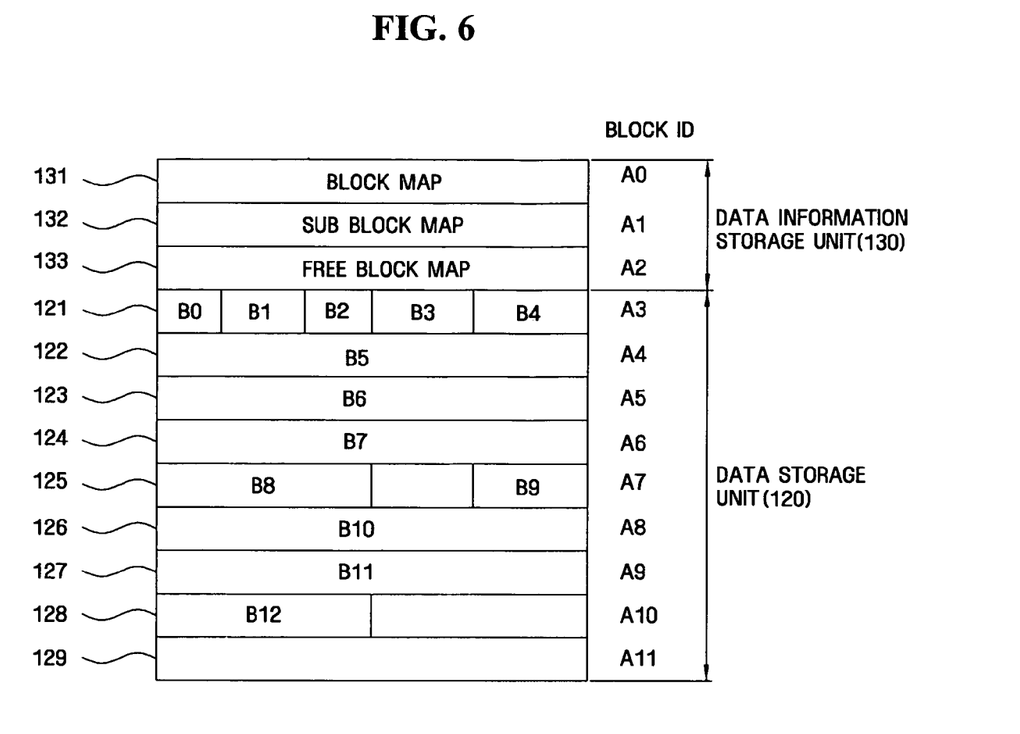
FIG. 6 illustrates the file system format of FIG. 4 for storing additional data.

Specifically, the block map, sub-block map, and free block map, when data having a sub-block ID of B12 and 50 KB size is stored in the data storage unit 120 as illustrated in FIG. 6 are identified in Tables 5, 6 and 7.

TABLE 5

| BLOCK ID | USED SPACE |
|---|---|
| A0 | 100 |
| A1 | 100 |
| A2 | 100 |
| A3 | 100 |
| A4 | 100 |
| A5 | 100 |
| A6 | 100 |
| A7 | 75 |
| A8 | 100 |
| A9 | 100 |
| A10 | 50 |
| A11 | 0 |

TABLE 6

| SUB-BLOCK ID | BLOCK ID | STARTING POSITION | SIZE | NEXT SUB-BLODK ID |
|---|---|---|---|---|
| B0 | A3 | 0 | 15 | EOF |
| B1 | A3 | 15 | 20 | EOF |
| B2 | A3 | 35 | 15 | EOF |
| B3 | A3 | 50 | 25 | EOF |
| B4 | A3 | 75 | 25 | B5 |
| B5 | A4 | 0 | 100 | B6 |
| B6 | A5 | 0 | 100 | B7 |
| B7 | A6 | 0 | 100 | B8 |
| B8 | A7 | 0 | 50 | EOF |
| B9 | A7 | 75 | 25 | EOF |
| B10 | A8 | 0 | 100 | EOF |
| B11 | A9 | 0 | 100 | EOF |
| B12 | A10 | 0 | 50 | EOF |

TABLE 7

| BLOCK ID | STARTING POSITION | SIZE |
| --- | --- | --- |
| A7 | 50 | 25 |
| A10 | 50 | 50 |
| A11 | 0 | 100 |

As described above, the file system management method according to an exemplary embodiment of the present invention can be applied to storage of the data and also to deletion of the data stored in the data storage unit 120.

Figure 7:
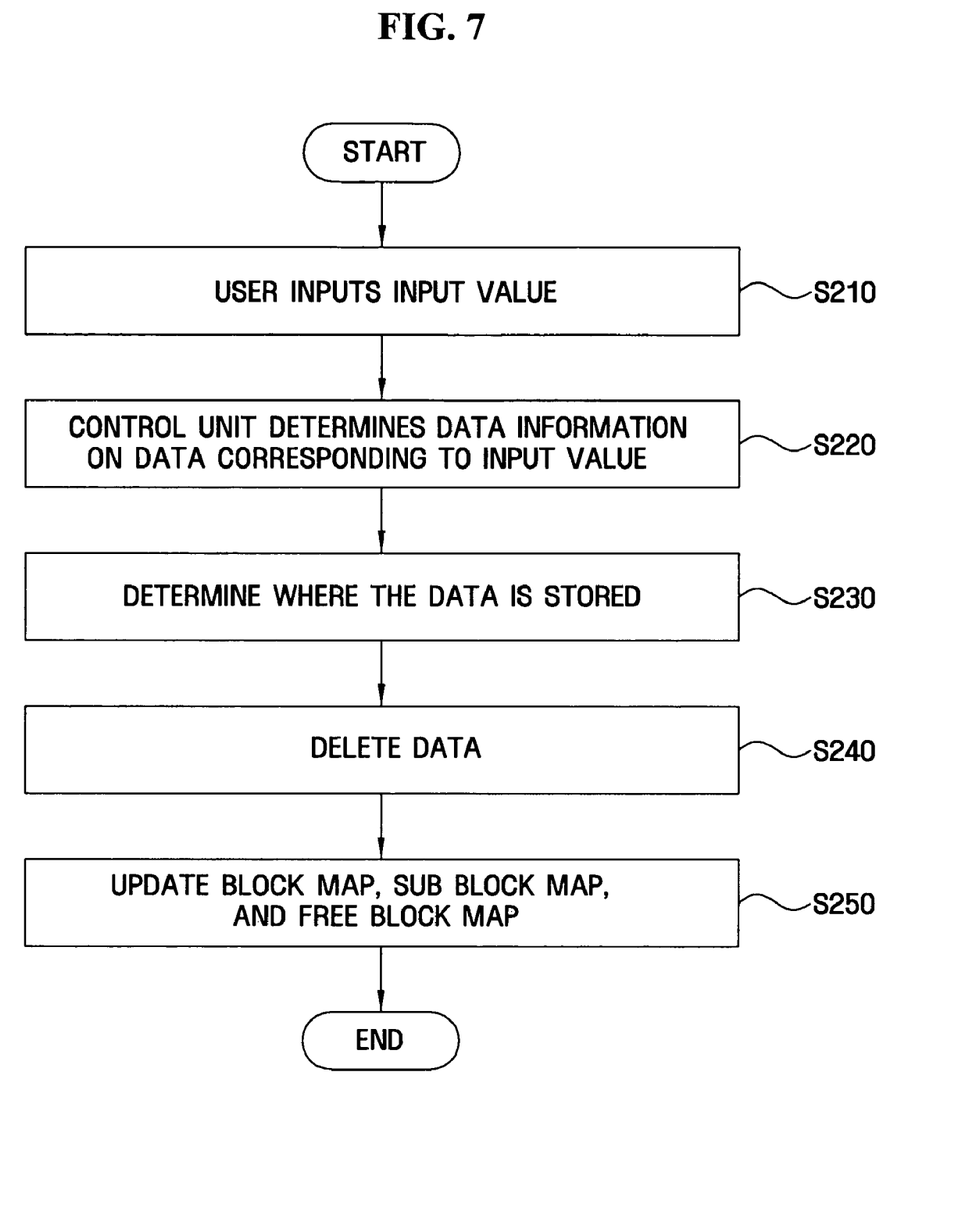
FIG. 7 is a flowchart illustrating a method of deleting data stored in the data storage unit according to an exemplary embodiment of the present invention.

FIG. 7 is a flowchart illustrating a method of deleting data stored in the data storage unit according to an exemplary embodiment of the present invention.

As illustrated, a user inputs an input value to delete predetermined data from the data storage unit 120 through the user input unit 100 S210.

The control unit 140 determines data information on the data corresponding to the input value S220. This data information may be a sub-block ID and the size of the predetermined data.

The control unit 140 determines the position of the stored data by referring to the block map, sub-block map, and free block map S230.

After the data position has been determined through the block map, sub-block map, and free block map, the control unit 140 deletes the data S240.

The control 140 updates the block map, sub-block map, and free block map after data has been deleted S250.

Figure 8:
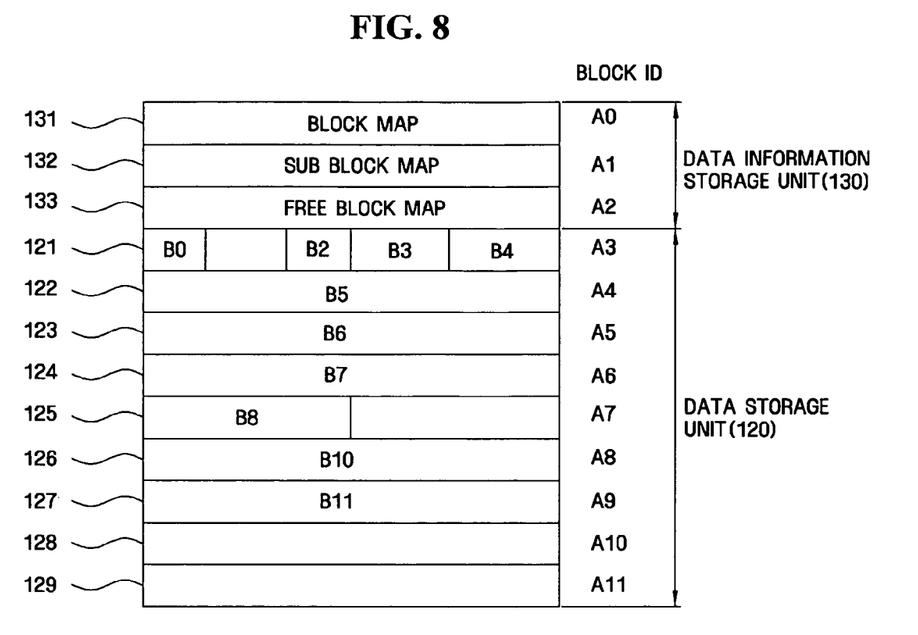
FIG. 8 illustrates the file system format after data stored in the data storage unit is deleted according to an exemplary embodiment of the present invention.

Specifically, the block map, sub-block map, and free block map, corresponding to Tables 8, 9 and 10, respectively, are updated when data having a sub-block IDs of B1 and B9, which are stored in the data storage unit 120 shown in FIG. 4, are deleted from the data storage unit 120 as illustrated in FIG. 8.

TABLE 8

| BLOCK ID | USED SPACE |
| --- | --- |
| A0 | 100 |
| A1 | 100 |
| A2 | 100 |
| A3 | 80 |
| A4 | 100 |
| A5 | 100 |
| A6 | 100 |
| A7 | 50 |
| A8 | 100 |
| A9 | 100 |
| A10 | 0 |
| A11 | 0 |

TABLE 9

| SUB-BLOCK ID | BLOCK ID | STARTING POSITION | SIZE | NEXT SUB-BLODK ID |
| --- | --- | --- | --- | --- |
| B0 | A3 | 0 | 15 | EOF |
| — | — | — | — | — |
| B2 | A3 | 35 | 15 | EOF |
| B3 | A3 | 50 | 25 | EOF |
| B4 | A3 | 75 | 25 | B5 |
| B5 | A4 | 0 | 100 | B6 |
| B6 | A5 | 0 | 100 | B7 |
| B7 | A6 | 0 | 100 | B8 |
| B8 | A7 | 0 | 50 | EOF |
| — | — | — | — | — |
| B10 | A8 | 0 | 100 | EOF |
| B11 | A9 | 0 | 100 | EOF |

TABLE 10

| BLOCK ID | STARTING POSITION | SIZE |
| --- | --- | --- |
| A3 | 15 | 20 |
| A7 | 50 | 50 |
| A10 | 0 | 100 |
| A11 | 0 | 100 |

As described above, the apparatus and method for managing a file system can allocate block IDs and sub-block IDs to data blocks storing data in the file system and data stored in the data block, and store the data in an empty space of each data block, which is determined by the allocated block ID and sub-block ID, thereby being capable of efficiently using the space of the data block.

Although the apparatus and method for managing a file system according to the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments for illustration purposes and are not intended to limit the present invention as set forth in the claims.

What is claimed is:

1. An apparatus of managing a file system, comprising:
    a data storage unit that includes a plurality of data blocks each having a predetermined size that store data;
    a data information storage unit that stores data information on the data stored in the data blocks; and
    a control unit that writes the data into an empty space of each data block using the stored data information,
    wherein the data information storage unit comprises:
    a block map that comprises information on a total used space of each data block; and
    a sub block map that comprises information on a use space used by the data stored in the data blocks,
    wherein the control unit updates the block map and the sub block map in order to allow a user to reference the block map and the sub block map when storing data,
    wherein the sub-block map comprises a next sub-block ID allocated to a next sub-block corresponding to a set of data within a data block storing data.

2. The apparatus of claim 1, wherein the data information storage unit further comprises:
    a free block map that comprises information on the empty space within each data block.

3. The apparatus of claim 1, wherein the block map comprises a block ID allocated to each data block and information on the use space of the data block.

4. The apparatus of claim 1, wherein the sub-block map further comprises:
    a sub-block ID allocated to a sub-block corresponding to a set of data within a data block storing data;
    a block ID of the each data block in which the data is stored;
    a starting position of the set of data in the data block;
    a size of the data stored in each data block; and
    information on relationships with other data blocks if the set of data is divided and stored in the other data blocks because the size of the set of data exceeds that of one data block.

5. The apparatus of claim 4, wherein an additional sub-block ID is allocated to another sub-block of another data block when the size of the set of data exceeds that of the data block.

6. The apparatus of claim 2, wherein the free block map comprises a block ID of each data block and information on the empty space of each data block.

7. The apparatus of claim 2, wherein the control unit stores data in the empty space as indicated by the free block map, and ten updates the block map, the sub-block map, and the free block map.

8. A method of managing a file system comprising:
   providing a set of data;
   extracting data information on data stored in a plurality of data blocks; and
   storing the set of data in an empty space of at least one of the data blocks according to the extracted data information,
   wherein the data information comprises:
   a block map that comprises information on a total used space of each data block; and
   a sub block map that comprises information on a use space used by the data stored in the data blocks,
   wherein the block map and the sub block map are updated in order to allow a user to reference the block map and the sub block map when storing detail,
   wherein the sub-block man comprises a next sub-block ID allocated to a next sub-block corresponding to a set of data within a data block storing data.

9. The method of claim 8, wherein the data information further comprises:
   a free block map that comprises information on the empty space within each data block.

10. The method of claim 8, wherein the block map comprises a block ID allocated to each data block and information on the use space of each data block.

11. The method of claim 8, wherein the sub-block map further comprises:
   a sub-block ID allocated to a sub-Hock corresponding to a set of data within a data block storing data;
   a block ID of the data block;
   a starting position of the set of data in the data block;
   the size of the data stored in the data block; and
   information on relationships with other data blocks if the set of data is separated and stored in the other data blocks because the size of the data exceeds that of one data block.

12. The method of claim 11, wherein an additional sub-block ID is allocated to another sub-block of another data block when the size of the set of data exceeds that of the data block.

13. The method of claim 9, wherein the free block map comprises a block ID of each data block and information on the empty space of each data block.

14. The method of claim 9, further comprising updating the block map, sub block map, and free block map after storing the set of data in the empty space indicated by the free block map.

* * * * *